United States Patent

Kaneko et al.

[11] 4,424,432
[45] Jan. 3, 1984

[54] ELECTRODE MATERIAL FOR TRAVELLING-WIRE TYPE ELECTRICAL DISCHARGE MACHINING

[75] Inventors: Hideo Kaneko, 2-35-7 Wakabayashi, Setagayaku, Tokyo, Japan; Makoto Onoue, Kanagawaken, Japan

[73] Assignees: Hideo Kaneko, Tokyo; Inoue-Japax Research Incorporated, Yokohama, both of Japan

[21] Appl. No.: 956,329

[22] Filed: Oct. 31, 1978

[30] Foreign Application Priority Data

Nov. 10, 1977 [JP] Japan .................................. 52-134064

[51] Int. Cl.$^3$ .............................................. B23K 9/16
[52] U.S. Cl. .............................. 219/69 E; 219/69 W; 252/512
[58] Field of Search ....................... 252/512; 75/157.2; 148/11.5 C; 219/69 E, 69 W, 146.1

[56] References Cited

U.S. PATENT DOCUMENTS

| | | | |
|---|---|---|---|
| 2,161,467 | 6/1939 | Hensel et al. | 75/157.5 X |
| 4,193,852 | 3/1980 | Inoue | 219/69 E |
| 4,262,185 | 9/1981 | Delpretti | 219/69 W |
| 4,287,404 | 9/1981 | Convers et al. | 219/69 W |
| 4,320,280 | 3/1982 | Inoue | 219/69 W |

FOREIGN PATENT DOCUMENTS

| | | |
|---|---|---|
| 440480 | 12/1935 | United Kingdom . |
| 512142 | 8/1939 | United Kingdom . |
| 594283 | 11/1947 | United Kingdom . |
| 814577 | 6/1959 | United Kingdom . |
| 843824 | 8/1960 | United Kingdom . |
| 892281 | 3/1962 | United Kingdom . |
| 1030427 | 5/1966 | United Kingdom . |
| 1353430 | 5/1974 | United Kingdom . |
| 1399195 | 6/1975 | United Kingdom . |

OTHER PUBLICATIONS

Metallurgy of the Raw Materials, No. 2, "Zirconium", p. 20 QA. Publication, No. 43, pp. 29, 32.

Primary Examiner—Josephine Barr
Attorney, Agent, or Firm—Karl F. Ross; Herbert Dubno

[57] ABSTRACT

A method of electrical machining by the travelling-wire EDM process is improved by utilizing as the wire electrode for increased removal rate and reduced wear an electrode material which is drawn from a composition of 0.1 to 3% by weight zirconium, 0.3 to 10% zinc and the balance copper.

6 Claims, 2 Drawing Figures

ELECTRODE MATERIAL FOR TRAVELLING-WIRE TYPE ELECTRICAL DISCHARGE MACHINING

FIELD OF THE INVENTION

The present invention relates to an electrode material for travelling-wire type electrical discharge machining and, more particularly, to a material composition suitable to form such electrodes as well as a wire or the like elongate thin electrode made therefrom.

BACKGROUND OF THE INVENTION

In travelling-wire type electrical discharge machining, a continuous wire-like electrode which is typically of a thickness or diameter not greater than 0.5 mm or 0.2 mm is moved axially while being guided between a pair of support members under suitable tension and a workpiece is disposed in juxtaposition with the wire electrode moving or travelling between the support members. Electric energy in the form of time-spaced electrical pulses is applied across the travelling wire electrode and the workpiece which form a machining gap therebetween flooded with a dielectric fluid to effect a series of electrical discharges thereby removing material from the workpiece. As material removal proceeds, the workpiece is displaced relative to the travelling wire electrode in a prescribed path to produce a desired cutting pattern in the workpiece.

In order to achieve machining with stability and efficiency and without interruption, the wire materials must be of high mechanical strength and resistive to erosion and must be capable of removing material at a high rate. In addition, such electrode materials need to be sufficiently ductile to permit drawing into thin wires and also should be low in both material and production costs.

Heretofore, copper wire has been most commonly utilized in travelling-wire electrical discharge machining since copper is ductile and thus readily obtainable in thin and elongated forms. Copper electrodes, especially in wire form, however, are unsatisfactory in their attainable maximum removal rate and also low in wear or erosion resistance so that they tend to break during machining operations. The removal rate may be increased by the use of brass or copper alloy containing 30% by weight zinc or more which, however, does not improve wear resistance. Additionally brass is relatively expensive and harder to draw. Thus, brass wires adapted in a fine electrode diameter or size become much more costly than pure copper elongates.

OBJECT OF THE INVENTION

It is therefore the object of the present invention to provide an electrode material for travelling-wire type electrical discharge machining, which is less expensive to manufacture and possesses high physical strength, has excellent removal-rate characteristics, and suffers less discharge wear or erosion.

SUMMARY OF THE INVENTION

The present invention is based upon investigations with binary and ternary alloys containing copper and one or two additives selected from zirconium, manganese, chromium, zinc, silver and cobalt. Electrical-discharge-machining tests have been conducted with travelling-wire electrode variously made from these alloys and it has been shown that the ternary Cu/Zr/Zn alloy especially composed in certain proportions yields excellent results.

In accordance with the present invention there is provided an improved electrode material for travelling-wire type electrical discharge machining, which material consists by weight essentially of 0.1 to 3% zirconium, 0.5 to 10% zinc and the balance copper.

The alloy according to the invention is found to exhibit excellent physical strength and machining properties (i.e. removal rate and electrode wear) while being readily drawable to permit a wire electrode of a desired fine machining thickness to be prepared with inexpensiveness.

SPECIFIC DESCRIPTION

Figure 2:
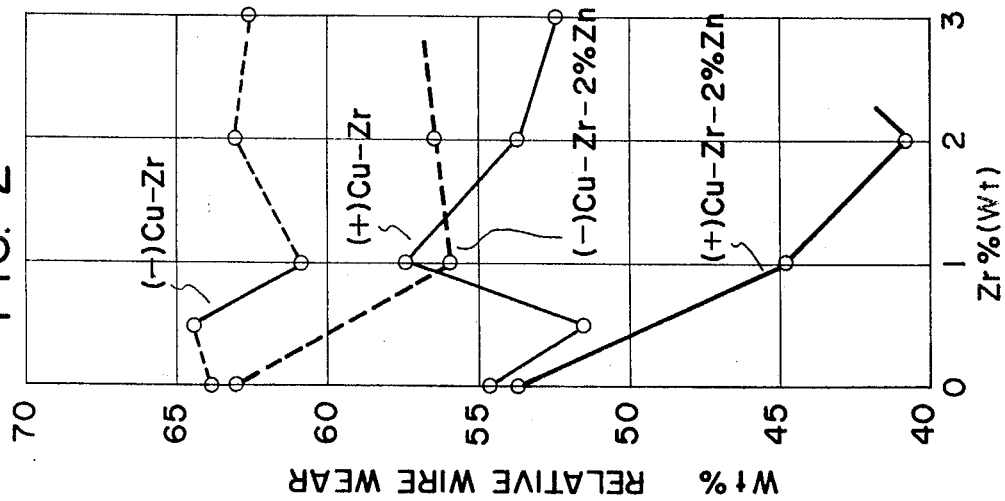
FIG. 2 is a graph of electrodes wear vs. zirconium content.
Figure 1:
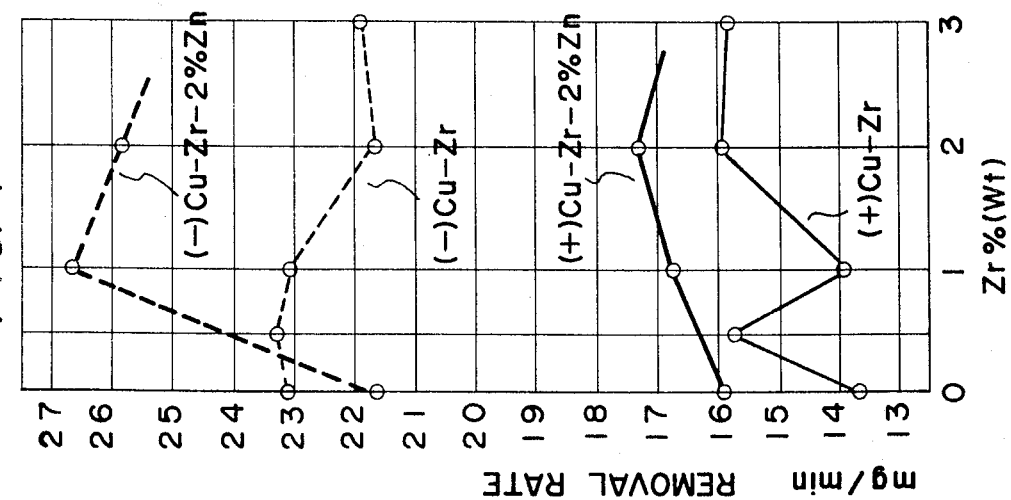
FIG. 1 is a graph of removal rate vs. zirconium content for composition of the present invention.

The invention will be described by way of example with reference to the accompanying drawing in which FIGS. 1 and 2 are graphs showing the effects of the amount of zirconium component in binary copper/zirconium and ternary copper/zirconium/zinc alloys plotted in weight percentage along the abscissa with the ordinate plotting the removal rate in mg/minute (FIG. 1) and the relative electrode wear (FIG. 2) in weight percentage (the amount of electrode wear divided by the amount of workpiece removal) observed in travelling-wire electrical discharge machining with wire electrodes composed in various proportions of the binary and ternary alloys. In both graphs, solid curves labelled with (+) sign represent results of machining in the case of normal polarity in which the workpiece is poled positive and the wire electrode poled negative while dotted curves labelled with (−) represent results of machining with the reverse electrode polarity.

(1) Preparation of alloy bodies and wires thereof:

Copper, zirconium and zinc components are mixed in various proportions and each mixture is cast in an inert atmosphere to form a cylindrical rod which is then machined into an elongate body of a diameter of 3 mm. The body is subjected to a repeated drawing operation with the successive drawing steps being intervened or each followed by an annealing procedure at a temperature of 600° C. for a period of 30 minutes until a wire of a diameter of 0.2 mm is formed. The wire formed shows a tensile strength of 30 to 90 Kg/mm$^2$.

(2) Travelling-Wire Electrical Discharge Machining Conditions:

With each wire produced in (1) used as a travelling-wire electrode, a workpiece composed of JSC SKD-11 (an alloy tool steel) is machined using as machining fluid a distilled water having a specific resistivity of 175 to 75×10$^4$ ohm-cm. Machining pulses have a pulse on time of 8 microseconds, pulse off time of 15 microseconds and pulse peak current of 10 amperes.

From the graphs of FIGS. 1 and 2, it is seen that the addition of both zinc and zirconium to copper as compared with only addition of zirconium markedly increases removal rate and decreases relative electrode wear. Such effects of the compound addition of zinc and zirconium is not predictable from those of the single addition of each component, it being noted that properties of a copper/zinc alloy which contains 10% or less zinc lie in a proportional relationship with those of an ordinary brass containing 30% zinc and a pure copper.

While improvements in properties are recognized both in machining with regular and reverse polarities, a decrease in relative electrode wear in the regular polarity and an increase in removal rate in the reverse polarity are remarkable.

While machining performance is illustrated in the drawing only with respect to 2% by weight zinc ternary compounds, similar results have been found to be obtained generally with addition of zinc generally between 0.5 and 10% by weight and preferably in the range between 0.5 and 3% by weight, except to note that as apparent from the aforementioned properties of zinc/copper alloys the removal rate tends to shift slightly proportional to the amount of zirconium added. Precise particulars in this regard are, of course, dependent upon particular machining conditions, viz. precise manner of preparing wires and discharge machining conditions.

It has been seen that with zirconium added in less than 0.1% by weight and zinc less than 0.5% by weight no appreciable synergetic effects are observed by the compound addition of these components.

When the proportion of zirconium exceeds 3% by weight, not only is its meaning of addition lessened but there result detriments depending upon machining conditions. Accordingly, the addition of zirconium should range between 0.1 and 3 and preferably between 0.5 and 2% by weight.

Brief description of the detriments just mentioned in the preceding paragraph may be appropriate. While the zirconium may be effective to enhance the mechanical strength of the alloy, the solid-soluble limit of zirconium into γ-phase copper appears to be about 1%. Thus, with more than 1% zirconium, the alloy takes the form of a mixture with metallic compounds such as $ZrCu_3$ distributed in γ-Cu, the compounds being precipitated to form eutectic crystals with 9% zirconium. The growth of the precipitates in amount causes an increase in hardness and tensile strength of the alloy and at the same time a drop in its elongation and electric conductivity which limits the amount of zirconium which may be incorporated. On the other hand, zinc may be added to expand the range of zirconium that may be added and also to facilitate occurrence of machining discharges which contributes to the increase of removal rate. While in this sense the upper limit of zinc component may possibly be as high as 30% by weight, the increase of removal rate saturates at 10% by weight addition thereof with a small amount of zirconium simultaneously incoporated. The work hardening of the alloy is progressively noticeable as the amount of zinc in combination with zirconium is increased. Accordingly, the amount of zinc added should be at most 10% by weight and, preferably, not greater than 5% by weight.

An alloy body of the composition according to the invention which has been drawn and thereafter annealed at a temperature of 600° C. for a period of 30 minutes shows a tensile strength of in excess of 40 $Kg/cm^2$ and an elongation in excess of 45%, the body exhibiting resistance to breakage in the course of a travelling-wire electrical discharge machining operation.

In accordance with the present invention there is thus provided an improved electrode material for travelling-wire type electrical discharge machining, which is markedly superior in properties and economy to existing counterparts.

What is claimed is:
1. A method of machining a workpiece which comprises the steps of:
   (a) drawing an elongated element having a thickness not greater than 0.5 mm from a cast composition consisting of 0.1 to 3% by weight zirconium, 0.5 to 10% by weight zinc, and the balance copper;
   (b) displacing said elongated element along a predetermined path to form a travelling-wire machining electrode therefrom and juxtaposing the travelling-wire machining electrode with a workpiece across a machining gap flooded with a liquid dielectric;
   (c) applying time-spaced electrical pulses across said electrode and said workpiece to effect electrical discharges across said gap and machine said workpiece; and
   (d) relatively displacing said path of said electrode of said composition and said workpiece to form a machined contour in said workpiece.
2. The method defined in claim 1 wherein the zinc content of said composition is not greater than 5% by weight and the zirconium content is at least 0.5% by weight but not greater than 2% by weight.
3. The method defined in claim 2 wherein the zinc content is at most 3% by weight.
4. The method defined in claim 1 wherein the element is drawn in a plurality of drawing steps with intervening annealing.
5. In an apparatus for the electrical machining of a workpiece wherein a travelling-wire electrode is displaced along a predetermined path and is juxtaposed with said workpiece across a machining gap, a liquid dielectric is fed to said gap, and time-spaced machining pulses are applied across said gap, the improvement wherein said travelling-wire electrode is a drawn elongated element consisting of 0.1 to 3% by weight zirconium, 0.5 to 10% by weight zinc and the balance copper.
6. The improvement defined in claim 5 wherein the zirconium content of said composition is 0.5% by weight to 2% by weight and the zinc content thereof is at most 3% by weight.

* * * * *